(12) United States Patent
Jayawardena

(10) Patent No.: US 6,807,151 B1
(45) Date of Patent: Oct. 19, 2004

(54) APPARATUS AND METHOD FOR GROUP-WISE DETECTION OF FAILURE CONDITION

(75) Inventor: Thusitha Jayawardena, Howell, NJ (US)

(73) Assignee: AT&T Corp, Bedminster, NJ (US)

( * ) Notice: Subject to any disclaimer, the term of this patent is extended or adjusted under 35 U.S.C. 154(b) by 0 days.

(21) Appl. No.: 09/536,515

(22) Filed: Mar. 27, 2000

(51) Int. Cl.⁷ .............................. H04J 3/06; H04J 3/14
(52) U.S. Cl. .................. 370/241; 370/470; 370/506; 370/518; 327/141; 375/357; 375/375
(58) Field of Search ................. 370/241, 247, 370/248, 251, 470, 476, 503, 505, 506, 516, 518; 327/141, 144, 145, 291, 292, 293, 298, 334, 336, 365; 375/354, 357, 362, 369, 370, 371

(56) References Cited

U.S. PATENT DOCUMENTS

| | | | | |
|---|---|---|---|---|
| 3,597,539 A | * | 8/1971 | Clark | 178/69.5 R |
| 3,798,378 A | * | 3/1974 | Epstein | 179/15 BS |
| 4,237,552 A | * | 12/1980 | Aikoh et al. | 370/83 |
| 4,606,042 A | * | 8/1986 | Kahn et al. | 375/2.1 |
| 4,634,110 A | * | 1/1987 | Julich et al. | 371/11 |
| 5,694,428 A | * | 12/1997 | Campana, Jr. | 375/260 |

* cited by examiner

Primary Examiner—Alpus H. Hsu

(57) ABSTRACT

Group-wise testing of the clocks arriving at a switching office is undertaken by multiplexing the clocks onto a single line and developing a signal therefrom that is indicative of a problem, if it exists, in any of the component signals that were multiplexed. In one embodiment, the developed signal is a gated portion of the multiplexed signal. That signal is integrated over an integration frame and compared to the integrated signal of another integration frame. A difference between the two compared signals indicates that at least one of the clocks is out of frequency synch. Subsequent tests identify the offending clock, or clocks.

14 Claims, 1 Drawing Sheet

APPARATUS AND METHOD FOR GROUP-WISE DETECTION OF FAILURE CONDITION

BACKGROUND OF THE INVENTION

This relates to group-wise detection of failure conditions, and in particular to detection of synchronization failures in a telecommunications network.

Telecommunication networks comprise switches that are interconnected by links, or trunks. In networks that employ digital switches that are interconnected via digital transport means, it is important for the switches to be synchronized with each other. This is achieved, typically, by using the same nominal frequency in the various switches and employing buffers at the interfaces between the switches and the transport means. The buffers easily compensate for phase differences and for small, temporary variations in frequency, but they cannot indefinitely compensate for variations in the average frequency. When the average frequencies are not the same, or when the frequency fluctuations are not short-term, the buffer cannot absorb the lack of frequency synchronization, and data is lost (or duplicated). The resulting degradation is known as "slip." In voice communication, a slip has no noticeable impact, but in data communication a slip may result in various unwanted effects, such as partial obliteration of text (in a facsimile transmission), a request to retransmit data (in digital data transmission), a temporarily frozen picture (in video transmission) etc. With the advent of SONET transmission technology, the synchronization network had to be updated. SONET imposes two constraints on the synchronization network: SONET transmission equipment needs synchronization, and transporting synchronization signals over SONET can degrade their synchronization performance. The previous transmission systems did not require synchronization, and synchronization signals could be transported over these systems without significant degradation.

Before SONET, the AT&T synchronization network had a two-tier system where, in the top tier, 16 locations throughout the United States maintained a primary reference clock, while the second tier received the synchronization frequency via a T1 carrier system. The primary reference clocks were synchronized to the GPS. Having introduced SONET, the AT&T network now employs a single tier system with almost every switching and transmission offices (hundreds) maintaining a primary reference clock that is synchronized to the GPS.

The frequency derived from the GPS has short-term variability, and the GPS signal is sometimes unavailable due to various reasons. Therefore, Building Integrated Timing Supply (BITS) clocks are deployed at every office to filter out short-term variability of GPS-supplied frequency, as well as, to temporarily maintain a stable frequency source in the network during potential unavailability of GPS. High quality BITS clocks can maintain the synchronization frequency for long periods, typically weeks, without an impact on customer services. Eventually, if the GPS signal is not received or the BITS clock has a failure, the frequency will degrade and cause slips. Hence, monitoring equipment is used to compare the frequencies of different BITS clocks to each other. Each office, therefore, includes monitoring equipment to derive the BITS clock of other offices from signal arriving on the various links that are coupled to the remote office BITS clock.

At a minimum, the number of clocks that need to be compared is three, because when comparing one clock to another and a discrepancy is found, it is not known which is the correct clock. When three or more frequencies are compared and a frequency difference between them is found, majority voting can be employed to identify the errant clock.

Since each office receives a fairly large number of signals from different offices, checking each of the clocks for synchronization is time consuming and expensive. Furthermore, when high quality BITS clocks are deployed, monitoring individual signals from BITS clocks can be avoided without compromising the reliability of the synchronization network.

SUMMARY

An improved approach is achieved by realizing that, even if there is a frequency synchronization problem, most of the clocks would be synchronized and the problem relates to one, or very few clocks. With this realization, group-wise testing of the clocks arriving at a switching office is undertaken by multiplexing the clocks onto a single line and developing a signal therefrom that is indicative of a problem, if it exists, in any of the component signals that were multiplexed. In one embodiment, the developed signal is a gated portion of the multiplexed signal. That signal is integrated over an integration frame and compared to the integrated signal of another integration frame. A difference between the two compared signals indicates that at least one of the clocks is out of frequency synch. Subsequent tests identify the offending clock, or clocks.

DETAILED DESCRIPTION

Figure 1:
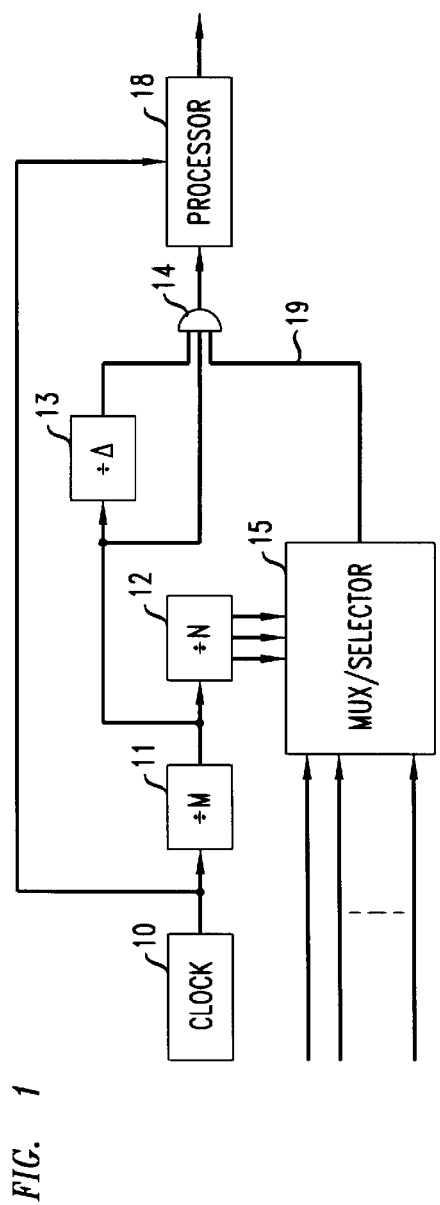
FIG. 1 presents a block diagram of an arrangement that implements the group-wise testing principles disclosed herein.

FIG. 1 presents a block diagram of a clock synchronization circuit in accordance with the principles of this invention. Clock 10 is the BITS clock of the local office. The goal is to determine whether various clocks that are embedded in signals that arrive at the office are synchronized in frequency to clock 10. This is achieved by deriving clock signals from the incoming signals (via conventional circuitry that is not shown in FIG. 1) and applying the derived clock signals to multiplexer 15, which develops a single stream signal at its output under control of clock 10. The control exercised by clock 10 on the creation of the single stream signal is effected through a divide-by-M circuit 11 that drives a divide-by-N circuit 12. The value of M is arbitrary, while N equals the number of input signals at multiplexer 15. The output signal of circuit 11 is delayed one clock period in element 13 and applied to AND gate 14, while the inverted output signal of element 13 is applied to AND gate 14. The signals from elements 11 and 13 that are applied to gate 14 enables the signal on line 19 to pass through AND gate 14 during the first period following the up transition of the output signal of element 11. When element 12 is designed to change state in response to the up transition of its input signal, the one clock period during which the output signal of multiplexer 15 is enabled to pass through AND gate 14 corresponds to the beginning of a multiplexer 15 frame. A frame of multiplexer 15 is the period of time during which the input signal of one of the incoming clocks is passed through to the output of multiplexer 15. The frames of multiplexer 15 are synchronized (in frequency and in phase)

to clock 10, each frame being M clock periods long. A time interval that corresponds to N frames is termed herein a "super frame."

The output of AND gate 14 is applied to processor 18 wherein it enables a counter to count clock periods of the internal clock of processor 18. The frequency of the internal clock of processor 18 is arranged to be significantly higher than the frequency of clock 10, so that differences in the width of pulses that gate 14 outputs can be ascertained. If necessary (because of limitations in the clock frequency of processor 18), clock 10 may be constructed to be a sub-multiple of the BITS clock. Effectively, the count of internal clock periods that is enabled by the output of gate 14 forms an integration of the output signal of gate 14. The results of the integration are captured at regular intervals, and the count is reset immediately following the capture of the count. The period of integration is termed herein the "integration frame."

In accordance with one good embodiment, the integration frame corresponds to the super frame. In such an embodiment, portions of all N incoming clocks are included in the integrated signal. That, however, is not a requirement. There may be two or more integration frames in each super frame, and the different integration frames need not be of the same duration.

Figure 2:
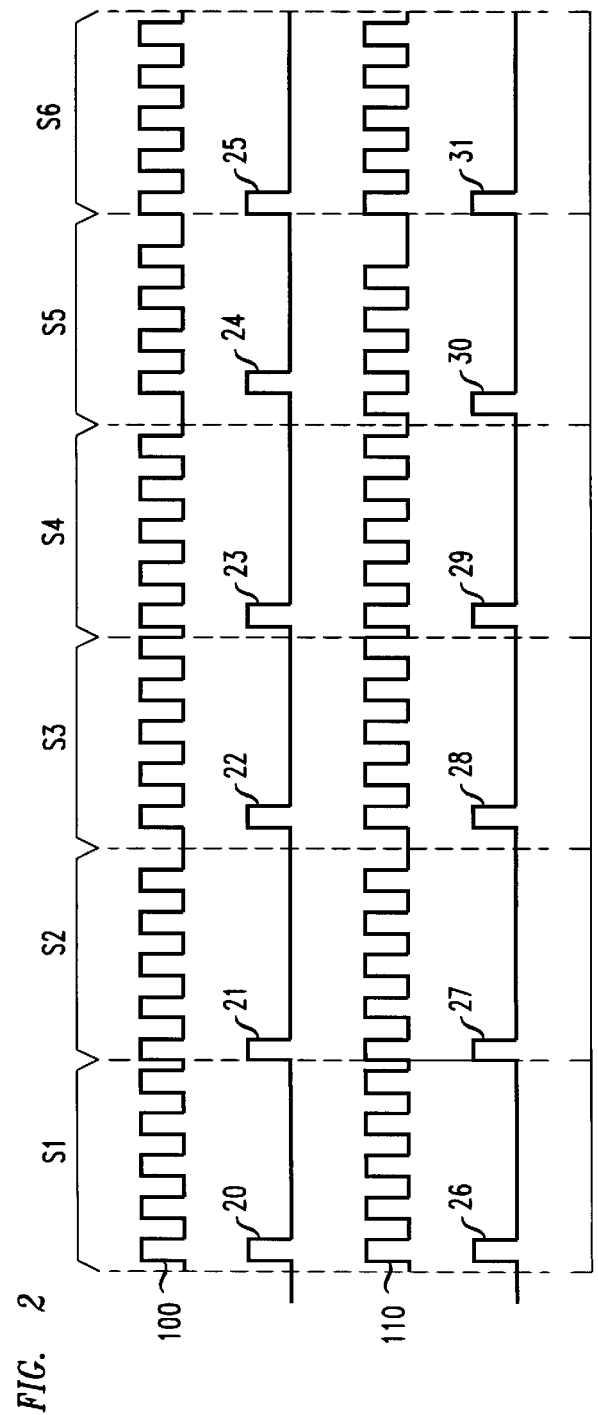
FIG. 2 illustrates some of the signals in the FIG. 1 arrangement.

FIG. 2 illustrates the signal on lead 19 and the signal at the output of AND gate 14 during two different super frame time intervals (one below the other), and the following description relates to an embodiment where the integration frame is congruent with the super frame. The number of incoming clocks (N) in FIG. 2 is six (signals S1 through S6), the length of a frame (M) is 5 periods of clock 10, signal segment 100 corresponds to the output of multiplexer 15 during one super frame, and signal segment 110 corresponds to the output of multiplexer 15 during a super frame that is k super frames later. As drawn, clocks S1 through S6 are multiplexed onto line 19 in order, and that is depicted in FIG. 2 by the S1 through S6 references at the top of the FIG. Also as drawn, clocks S2 and S6 happen to be synchronized to clock 10 both in frequency and in phase. The phase synchronization can be observed from the fact that the output of AND gate 14 during those frames (pulses 21, 27, 25 and 31) begin at the demarcation point of a frame. Also as drawn, clocks S1, S3, and S4 are synchronized in frequency with clock 10, but not in phase. The fact that there is a phase difference between clock 10 and clocks S1, S3, and S4 can be observed from the fact that the starting point of the output pulse of AND gate 14 in those frames (pulses 20, 26, 22, 28, 23, and 29) does not correspond to the starting point of those frames. Finally, as drawn, clock S5 is not in frequency synchronism with clock 10 and is, in fact, about 10% slower. The fact that it is not in frequency synchronism can be observed from the fact that the starting point of pulse 24 relative to the starting point of the frame is different from the starting point of pulse 30 relating to the starting point of the frame, and from the fact that the widths of pulses 24 and 30 are different. Conversely, clocks that are in frequency synchronism yield a pulse at each integration frame that starts at the same relative instant and is of the same width. As an aside, the fact that pulse 30 is wider than half the period of clock 10 indicates that clock S6 is slower than clock S1.

As indicated above, processor 18 integrates the signal on line 19 within an integration frame. In accordance with the principles disclosed herein, the integration values that are captured at the end of each integration frame are compared to each other. Consequently, the phase of the different pulses that are integrated within each integration frame are completely unimportant, and even the widths of those pulses are unimportant. The only factor that is important is differences between the sum of the pulse widths in one integration frame, for example, integration frame 100, and the sum of the pulse widths in another integration frame, for example, integration frame 110. If one of the clocks is not synchronized in frequency, as is the case with respect to clock S5 in FIG. 2, then successive integration frames lead to different counts within processor 18. The existence of different counts at the end of successive integration frames, or at least some successive integration frames, indicates that at least one of the clocks is not synchronized in frequency.

It should be realized that there is a finite, albeit very small, probability that two of the incoming clocks are out of synchronization with clock 10 and that one clock has a higher frequency while the other clock has a lower frequency. There is also a non-zero probability, albeit very much smaller, that the periods of the two clocks are such that their sum is equal to precisely the period of clock 10. In such a case, if both clocks are encompassed within a single integration frame (which the would be if the integration frame is congruent with the super frame), it is possible that the counts at different integration frames would not differ even though the two clocks that are out of frequency synchronism. To overcome the slight probability that such an event might occur and go undetected, a particular embodiment might alter the number of frames in the integrator frame, i.e., occasionally select a different number between 2 and N for the integrator frame. This altering may be made in some randomized manner. The frames not selected for the integrator frame may be simply ignored, or employed in a secondary integrator frame that is analyzed in parallel with the primary integrator frame.

In some applications it may be deemed desirable to have the ability to randomize the order in which multiplexer 15 selects the incoming clock signals. This can be achieved quite simply with a 1:1 mapping circuit interposed between element 12 and multiplexer 15.

The above discloses apparatus, and the method by which processor 18 determines whether the group of signals that are encompassed by an integration frame is in synchronism with clock 10. When processor 18 detects a failing in synchronization, it may be a failing in one of the clocks, in a number of the clocks, or in all of the clocks. It is possible that clock 10 is correct and all other clocks are wrong, but the probability of a that conclusion being correct is extremely low, and the much more likely condition is that clock 10 is out of synchronism. If desired, the conclusion that clock 10 is out of synchronism can be tested with a simple double pole double throw switch (electronic, of course) that applies clock 10 to multiplexer 15, and applies one of the input clocks to circuit 11.

Once processor 18 concludes that one or more clocks in a group of clocks (encompassed by a particular integration frame) is/are out of synchronism—and it is not clock 10—, it remains to identify the offending clock. This can be achieved by employing the classic binary search approach, or by reducing the integration frame to a single frame and, effectively, allowing processor 18 to check each of the clocks individually (relative to clock 10).

It may be noted that the integration function that is performed in processor 18 basically combines error indication signals with the aid of a one-way function. A one-way function, in the context of this disclosure, is a function that commingles its inputs in a manner that prevents recovery of the individual inputs.

I claim:

1. A method for detecting an operational problem in a plurality of N signals comprising the steps of;

generating a time multiplexed composite signal having frames, and a super frame having N of said frames, where each of said frames in said super frame includes a signal that includes an attribute which indicates operational state of a different one of said N signals, combining with a one-way function, within an integration frame that corresponds to a selected number of said frames, the signals of the frames in said integration frame that posses an attribute that indicates operational state of its corresponding signal from said N signals, to form a signal with a combined attribute that indicates operational state of the set of signals of said frames in said integration frame;

determining whether said combined attribute indicates presence of an operational problem in said set of signals of said frames in said integration frame; and taking action in response to a determination that there is an operational problem in said set of signals of said frames in said integration frame.

2. The method of claim 1 where said integration frame is congruent with said super frame.

3. The method of claim 1 where said integration frame includes fewer than the number of frames in said super frame.

4. The method of claim 1 where said integration frame includes selected frames from said super frame, are consecutive frames of said multiplexed composite signal.

5. The method of claim 1 where said integration frame includes selected frames from non-consecutive frames of said multiplexed composite signal.

6. The method of claim 1 where said one-way function adds said signals of the frames.

7. The method of claim 1 where said one-way function integrates with respect to time said signals of the frames.

8. The method of claim 1 where the signal in each frame of said composite signal is a pulse.

9. The method of claim 8 where said attribute of the signal of a frame is embedded in a width of said pulse.

10. The method of claim 1 where said step of determining compares said combined attribute of one of said integration frames to said combined attribute of another one of said integration frames and, when the comparison concludes that the two combined attributes are not the same, concluding that an operation problem exists in said set of signals of said frames in said integration frame.

11. The method of claim 1 where said step of taking action comprises redefining said integration frame to consist of a different set of frames and repeating said steps of combining and determining.

12. The method of claim 1 further comprising the steps of altering the sequence of said N signals are assigned to said frames in said super frame.

13. The method of claim 1 where said step of multiplexing is carried out under control of a local clock.

14. The method of claim 13 further comprising the step of controlling said step of multiplexing with one of said N input clocks.

* * * * *